United States Patent Office

Re. 26,261
Reissued Sept. 5, 1967

26,261
ANODIC PREVENTION OF HYDROGEN EMBRITTLEMENT OF METALS

Spencer W. Shepard, Plainfield, and Charles K. Aldrich, Buttzville, N.J., assignors to Chemical Construction Corporation, New York, N.Y., a corporation of Delaware No Drawing. Original No. 3,147,204, dated Sept. 1, 1964, Ser. No. 10,861, Feb. 25, 1960. Application for reissue June 9, 1965, Ser. No. 462,769
7 Claims. (Cl. 204—147)

Matter enclosed in heavy brackets [ ] appears in the original patent but forms no part of this reissue specification; matter printed in italics indicates the additions made by reissue.

*ABSTRACT OF THE DISCLOSURE*

*Hydrogen embrittlement of ferrous metal surfaces in contact with process solutions containing cyanide, acetic acid and phosphoric acid impurities, such as crude acrylonitrile solution produced by acrylonitrile synthesis, is prevented by immersing an inert electrical conductor in the process solution and establishing an electrical potential between the conductor and the ferrous metal surface, so as to continuously maintain the ferrous metal surface anodic in electrical potential relative to the process solution, with the electrical potential serving to establish a current density such that the ferrous metal surface is continuously dissolved in the solution by a small and essentially negligible amount of induced corrosion.*

This invention relates to the prevention of metal failures due to absorption of hydrogen and consequent embrittlement of the metal.

It has been found that hydrogen absorption by metals in contact with fluids which commonly cause hydrogen embrittlement is prevented by maintaining an electrical potential between this metal and another metal immersed in the fluid and functioning as a cathode. In this manner, the metal to be protected is maintained sufficiently anodic so that local cathodes can no longer form on its surface, with the fluid acting as an electroylte in the electrical system. The current is usually an impressed electromotive force, but could also be a galvanic current if the electrochemical potential of the two metals is sufficiently far apart. In general, this invention protects metals from the hydrogen embrittlement that commonly occurs where fluids are being handled or stored which tend to form films that allow or encourage the deposition of atomic hydrogen which forms on cathodic areas during the normal corrosion process. Hydrogen embrittlement results when atomic hydrogen passes freely through the lattice of the metal, until it combines to form molecular hydrogen or compounds in voids or at grain boundaries within the metal which develop pressure in the metallic voids. These pressures weaken the metal so that it becomes brittle and eventually cracks.

The problem of hydrogen embrittlement is widely prevalent in the chemical and petroleum industry. Where this type of metal deterioration takes place, sudden cataclysmic cracking of vessels may occur without any prior warning. Thus hydrogen embrittlement may be distinguished from the more common corrosion situation in which there is a gradual failure due to metal wastage or other surface attack. Hydrogen embrittlement results from the actual absorption of hydrogen, usually atomic hydrogen, which is formed on metallic surfaces that become cathodic due to electrochemical processes of corrosion. Uusually the corrosion itself is not a serious problem, however, the film of hydrogen deposited on the metal surface forms gaseous compounds with non-metallics in the grain boundaries of the metal. Thus the hydrogen penetrates through the metal surface and is absorbed into the metal crystalline structure, resulting in deterioration of the strength of the metal due to embrittlement, and eventual failure of the chemical process vessel or other apparatus formed of the metal. Usually this failure is a sudden cracking or collapse, with attendant disastrous effects.

The major metal requiring protection against hydrogen embrittlement is steel. Steel process vessels and storage tanks are widely used in the chemical and petroleum industries, and hydrogen embrittlement of such vessels has been prevented in some cases by using a protective coating which separates the steel from the electroylte. This procedure is expensive and is only as reliable as the coating. As an alternative, hydrogen embrittlement can sometimes be prevented by using other metals. In some cases aluminum or stainless steel may be substituted for steel, but this may be prohibitively expensive. Other metallics which are sometimes susceptible to hydrogen embrittlement include the hardenable grades of stainless steel, copper and its alloys, and aluminum.

Although hydrogen embrittlement is widely encountered, in general this phenomenon occurs most frequently in systems involving weakly acid or alkaline solutions contaminated with sulfur compounds, cyanides, or compounds of arsenic or mercury. These contaminants are fairly widespread, especially in the petroleum and chemical industries, thus numerous industrial systems may be protected by the method of the present invention. Without so limiting the invention, it appears from a theorteical standpoint that hydrogen embrittlement occurs where the aforementioned contaminants are present because the natural surface film which forms on the steel surface is modified or eliminated due to chemical action of the contaminants, thus permitting hydrogen penetration into the metal. Of course, hydrogen embrittlement can sometimes be prevented by the elimination of these contaminants from the system or by the addition of air. However, these procedures are seldom feasible and are usually quite expensive. Hydrogen embrittlement has also been known to occur in metal pickling installations, such as where steel springs are processed. In such cases the springs which are produced are usually subject to premature failure and other defects.

It is an obpect of the present invention to prevent hydrogen embrittlement of metals.

Another object is to protect metallic structures and objects by preventing electrochemical deposition of hydrogen on metallic surfaces of these structures and objects.

A further object is to overcome the normal electrochemical potentials which are generated when metallic surfaces are in contact with corrosive solutions which tend to deposit hydrogen by rendering these surfaces sufficiently anodic to a cathode.

An additional object is to maintain metallic surfaces, particularly steel, at an anodic electrical potential relative to a solution in contact with the surface, thereby preventing hydrogen embrittlement of the metal .

These and other objects of the present invention will become apparent from the description which follows. In the present invention, a metallic object, such as a steel vessel or other container holding a solution which tends to deposit hydrogen on the vessel surface by electrochemical reaction is protected against subsequent hydrogen embrittlement of the metal in a novel manner. An electrical potential of suitable magnitude is maintained between the vessel wall and the solution. This potential is established by immersing a suitable cathode in the solution, and providing an electrical circuit between the vessel wall and the cathode using direct electric current from an external source. Thus the vessel wall is maintained anodic in charge, which is the reverse of cathodic protection systems now in fairly common use. The method of the present invention will usually cause an induced electrochemical corrosion, however, current density is regulated so that this corrosion is of a low order of magnitude and can be tolerated, while the far more serious problem of hydrogen evolution and subsequent rapid failure due to embrittlement is eliminated. Since the vessel wall is anodic in electrical potential relative to the solution, it becomes impossible for hydrogen to deposit on the wall since any tendency for hydrogen ions to lose their charge and form hydrogen atoms is artificially reversed by the strong anodic or positive potential of the wall. Thus negatively charged particles are preferentially discharged against the wall rather than against hydrogen ions, and no hydrogen film can form on the metallic surface of the wall.

The magnitude of the anodic potential required for the prevention of hydrogen deposition and consequent metal embrittlement is a function of the operating condition encountered. Thus the magnitude of anodic potential required must be empirically determined for each application. In any case, sufficient electric potential is applied to the metallic structure being protected from hydrogen embrittlement, to maintain all local areas of the surface at a positive potential. In general, the required minimum voltage potential between the solution and any point on the surface of the structure to be protected will be on the order of 0.8 volt. That is, every point on the surface will be maintained positive by at least 0.8 volt relative to a copper-saturated copper sulfate half cell in the electolyte. Excessive voltage is undesirable, since it will not produce any further protection and will also cause additional induced corrosion.

This system may be applied to vessels which are also coated, thus providing protection against hydrogen embrittlement at breaks in the coating. It should be noted that coated metallic surfaces require considerably less amperage for protection than comparable uncoated surfaces.

The method of the present invention was utilized at a commercial chemical plant engaged in the production of acrylonitrile. Much difficulty had been encoutered due to hydrogen embrittlement of steel vessels, since the acrylonitrile *solution containing cyanide, acetic acid and phosphoric acid impurities* reacted with the metal vessel walls to produce a hydrogen film which in turn formed gaseous compounds with non-metallics in the grain boundaries of the metal. The typical hydrogen embrittlement which took place thus resulted in a deterioration and failure of the vessel walls. The acrylonitrile contained slight amounts of potassium cyanide, acetic acid and phosphoric acid as principle impurities, with a total impurity content of about 6%.

The vessel walls were made anodic with controlled amounts of electrical current, which completely eliminated hydrogen deposition and prevented any subsequent hydrogen embrittlement. A minimum current density of 5 milliamperes per squire foot was maintained on that portion of the surface of the vessel in contact with the crude acrylonitrile. The voltage required to maintain this current density was a function of the resistivity of the solution which varied with impurity content and other operating factors. An operating voltage range between about 1 to 10 volts was generally employed. This applied electrical potential also caused an acid to form which was corrosive. However, this induced corrosion amounted to only 0.0025 inch/year and was thus an insignificant development which was readily tolerated since hydrogen embrittlement had been eliminated. The service life of the protected process vessels was thus greately extended.

A quantitative laboratory study of the effectiveness of the anodic protection method was also made, based on the effectiveness of the aforementioned industrial application. A synthetic crude acrylonitrile solution was prepared, containing 600 cc. acrylonitrile plus 14 grams each of potassium cyanide and acetic acid, 1 cc. of 85% phosphoric acid, and 4 cc. water. Two test pieces of mild steel, each having 0.88 square decimeter of surface area, were immersed in this solution for a five day test period. One steel test piece was unprotected, while the other was connected to a duriron cathode immersed in the solution so that an electrical potential was generated and maintained by galvanic action which kept the second test piece anodic in potential relative to the solution. After the five day test period the two test pieces were removed from the solution and weighed to determine whether the electrically induced corrosion was of appreciable magnitude. The protected piece had a weight loss of 0.2136 gram, which corresponded to a corrosion rate of 0.009 inch/year. The unprotected piece had a weight loss of 0.2396 gram, which corresponded to a slightly higher corrosion rate of 0.010 inch/year. Thus it is evident that, within the limits of experimental accuracy, no increase in corrosion rate was caused by the anodic protection method. The two test pieces were then qualitatively tested for hydrogen absorption by immersion in hot oil and observation of hydrogen evolution. At the elevated temperature, any hydrogen present is driven off as bubbles. No absorbed hydrogen was observed from the protected test piece, while the unprotected piece showed considerable evolution of bubbles of hydrogen. Thus the anodic protection procedure had effectively prevented hydrogen absorption in this test case, with negligible induced corrosion.

The method of the present invention should be distinguished from anodic protection technology of the prior art such as U.S. Patent No. 2,377,792 in which anodic potential is employed to preserve protective oxide films on materials such as stainless steel. In these cases a different phenomenon and mechanism is involved, since film preservation by anodic protection as practiced in the prior art is direceted to prevention of corrosion by chemical attack and subsequent total metal wastage. It should be noted that the prior art did not comprehend the utilization of anodic protection against hydrogen embrittlement, since in numerous instances such as the aforementioned acrylonitrile application the conventional chemical type of corrosion is not serious. Thus in such cases where conventional corrosion phenomena are not serious problems, but hydrogen embrittlement is a problem, application of anodic protection has heretofore not been comprehended by the prior art.

We claim:

1. In the process of acrylonitrile synthesis, the method of preventing hydrogen deposition on ferrous metal surfaces in contact with *an* acrylonitrile solution *containing cyanide, acetic acid and phosphoric acid impurities,* which comprises immersing an inert electrical conductor in said acrylonitrile solution, and establishing an electrical potential in the range of 1 to 10 volts between said conductor and said ferrous metal surface, whereby said surface is maintained continuously anodic in electrical potential relative to said solution, said electrical potential serving to establish a current density such that the ferrous metal surface is continuously dissolved into said solution by induced corrosion, said induced corrosion being of a small and essentially negligible order of magnitude.

2. Method of claim 1, in which said electrical potential is regulated to a magnitude at which an average current density of about 5 milliamperes per square foot is maintained on said surface.

*3. The method of preventing hydrogen embrittlement of a ferrous metal by preventing hydrogen deposition on the surface of said ferrous metal, said ferrous metal surface being in contact with a solution containing dissolved cyanide, acetic acid and phosphoric acid, which com-*

*prises immersing an inert electrical conductor in said solution, establishing an electrical potential between said ferrous metal surface and said conductor, whereby said ferrous metal surface is maintained continuously anodic in electrical potential relative to said solution, said electrical potential serving to establish a current density such that the ferrous metal surface is continuously dissolved insto said solution by induced corrosion, said induced corrosion being of a small and essentially negligible order of magnitude.*

*4. The method of claim 3, in which said electrical potential is in the range of about 1 to 10 volts.*

*5. The method of claim 3, in which said electrical potential is regulated to a magnitude at which an average current density of about 5 milliamperes per square foot is maintained on said surface.*

*6. The method of claim 3, in which said solution containing dissolved cyanide, acetic acid and phosphoric acid principally comprises an acrylonitrile solution.*

*7. The method of preventing hydrogen embrittlement of a ferrous metal by preventing hydrogen deposition on the surface of said ferrous metal, said ferrous metal surface being in contact with a solution contaminated with dissolved cyanide, acetic acid and phosphoric acid, which comprises immersing an inert electrical conductor in said solution, establishing an electrical potential between said ferrous metal surface and said conductor, whereby said ferrous metal surface is maintained continuously anodic in electrical potential relative to said solution, said electrical potential serving to establish a current density such that the ferrous metal surface is continuously dissolved into said solution by induced corrosion, said induced corrosion being of a small and essentially negligible order of magnitude.*

References Cited

The following references, cited by the Examiner, are of record in the patented file of this patent or the original patent.

UNITED STATES PATENTS

| | | | |
|---|---|---|---|
| 1,485,436 | 3/1924 | Slepian | 204—140 |
| 1,513,824 | 11/1924 | Kasley | 204—140 |
| 1,663,564 | 3/1928 | Rich | 204—140 |
| 1,731,269 | 10/1929 | Rich | 204—140 |
| 1,825,477 | 9/1931 | Reichart | 204—147 |
| 2,057,274 | 10/1936 | Mayhew | 204—140 |
| 2,360,244 | 10/1944 | McAuneny | 204—147 |
| 2,377,792 | 6/1945 | Lawrence et al. | 204—147 |
| 2,576,680 | 11/1951 | Guitton | 204—147 |
| 2,726,204 | 12/1955 | Park | 204—72 |
| 2,886,497 | 5/1959 | Butler | 204—1.1 |
| 3,147,204 | 9/1964 | Shepard et al. | 204—147 |

OTHER REFERENCES

Edeleanu: "Metallurgia," September 1954, pp 113–116.

Evans: "Metallic Corrosion Passivity and Protection" (1948), pp. 84–85.

Field et al.: "Electro-Plating," 1930, Pitman, pp. 77–79.

"Metals & Alloys," vol. 19, 1944, pp. 172 and 174.

Taylor: "Iron and Steel," vol. 17, July 1944, pp. 525–527.

U.S. National Bureau of Standards Circular No. 511, pp. 11–14, Sept. 24, 1951.

JOHN H. MACK, *Primary Examiner.*

HOWARD S. WILLIAMS, *Examiner.*

T. TUNG, *Assistant Examiner.*